United States Patent
Moskwa et al.

(10) Patent No.: US 7,506,537 B2
(45) Date of Patent: Mar. 24, 2009

(54) INTERNAL COMBUSTION ENGINE TESTING WITH THERMAL SIMULATION OF ADDITIONAL CYLINDERS

(75) Inventors: John J. Moskwa, Madison, WI (US);
Steven J. Klick, Madison, WI (US);
Brian D. Krosschell, Rochester, MN (US); Marcus D. Marty, Neillsville, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/469,741

(22) Filed: Sep. 1, 2006

(65) Prior Publication Data

US 2008/0053208 A1    Mar. 6, 2008

(51) Int. Cl.
*G01M 15/02* (2006.01)
(52) U.S. Cl. .................................... 73/114.68
(58) Field of Classification Search ............... 73/114.55, 73/114.56, 114.57, 114.68, 114.77, 118.02
See application file for complete search history.

(56) References Cited

U.S. PATENT DOCUMENTS

| | | | |
|---|---|---|---|
| 4,399,774 A * | 8/1983 | Tsutsumi ................. 123/41.1 |
| 4,489,680 A * | 12/1984 | Spokas et al. ............ 123/41.05 |
| 4,546,742 A * | 10/1985 | Sturges ................. 123/41.05 |
| 5,415,147 A * | 5/1995 | Nagle et al. ............. 123/563 |
| 6,394,044 B1 * | 5/2002 | Bedapudi et al. ......... 123/41.33 |
| 6,708,557 B2 | 3/2004 | Moskwa et al. |
| 7,124,021 B2 | 10/2006 | Moskwa et al. |
| 7,249,576 B2 * | 7/2007 | Jones ................... 123/41.31 |
| 2004/0216701 A1 * | 11/2004 | Hutchins ............... 123/41.08 |
| 2006/0183596 A1 * | 8/2006 | Etchason et al. ........... 477/98 |
| 2006/0190160 A1 | 8/2006 | Moskwa et al. |

FOREIGN PATENT DOCUMENTS

| DE | 100 61 631 C1 | 7/2002 |
| JP | 59 037439 A | 2/1984 |
| JP | 2001 208651 A | 8/2001 |

OTHER PUBLICATIONS

Klingsten, J., (2006) Engine R & D made easier, Automotive Testing Technology International, pp. 78-79.
PCT International Search Report, Feb. 19, 2008 PCT/US2007/067177.

* cited by examiner

*Primary Examiner*—Eric S McCall
(74) *Attorney, Agent, or Firm*—Craig A. Fieschko, Esq.; DeWitt Ross & Stevens S.C.

(57) ABSTRACT

During operation of a single-cylinder test engine, a computer or other processor runs a simulation of additional "virtual cylinders" operating alongside the single cylinder as if all cylinders, real and virtual, were present in a real multi-cylinder engine. Temperature data from the virtual cylinders is generated, and the real cylinder is jacketed with flow passages which are supplied with heat transfer fluid at temperatures such that the thermal presence of the virtual cylinders adjacent the real cylinder is simulated. As a result of this thermal simulation, the real cylinder is able to more accurately simulate the performance that it would have if it was indeed present in a multi-cylinder engine.

22 Claims, 1 Drawing Sheet

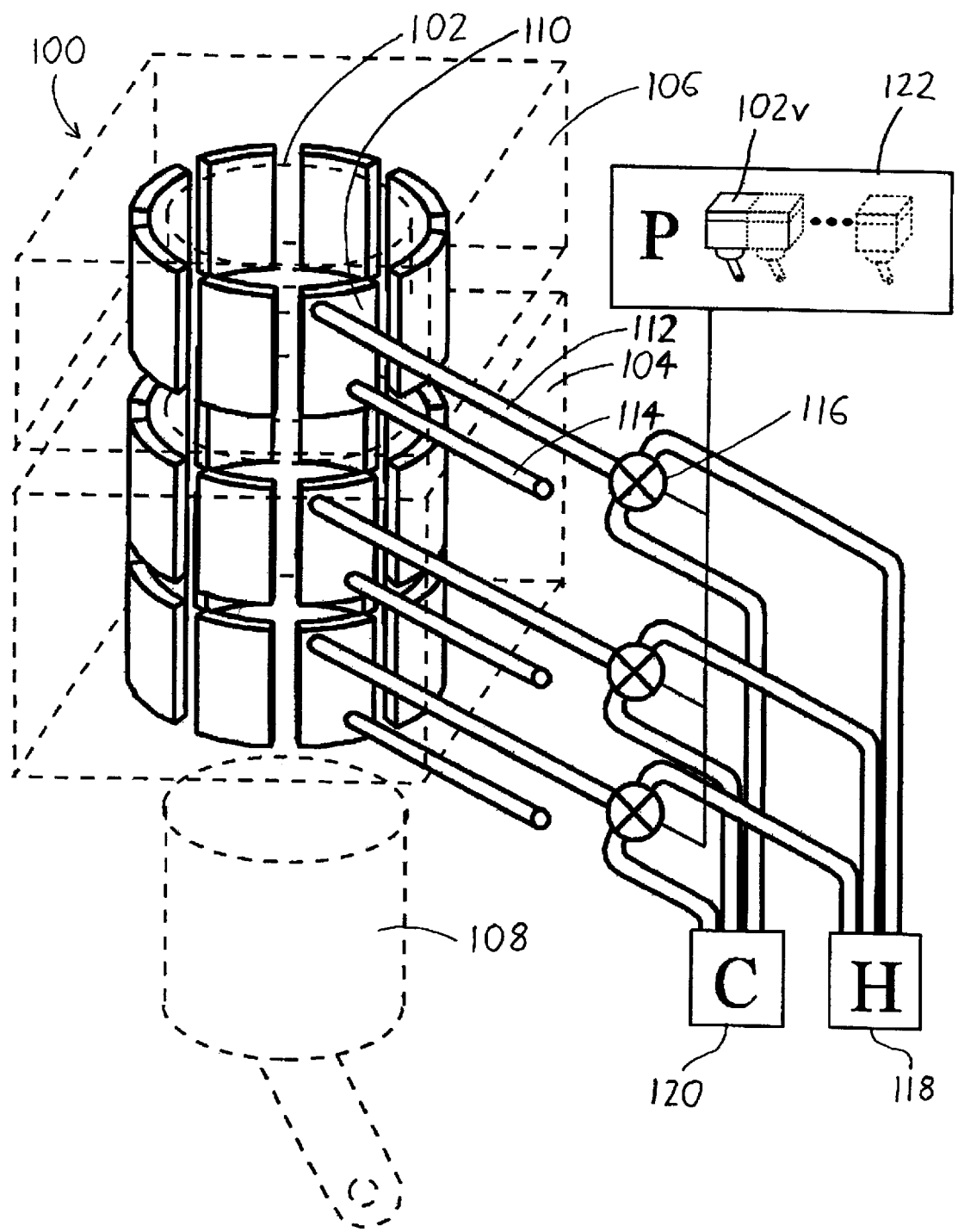

INTERNAL COMBUSTION ENGINE TESTING WITH THERMAL SIMULATION OF ADDITIONAL CYLINDERS

FIELD OF THE INVENTION

This document concerns an invention relating generally to engine testing devices, and more specifically to engine testing devices using single-cylinder test engines.

BACKGROUND OF THE INVENTION

As discussed in (for example) U.S. Pat. No. 6,708,557 to Moskwa et al. (which is incorporated by reference herein, and thus should be regarded as a part of this document), the single-cylinder test engine (1CTE) has long been an important and widely-used tool in engineering and development of internal combustion engines. The 1CTE is typically a single cylinder, piston and head taken from a multi-cylinder engine (MCE), or having a design adapted from a MCE, and which is used to simulate performance of an MCE on a smaller and simpler scale. Since the 1CTE has only a single cylinder, it is generally far less expensive and time-consuming to build and modify when working out design challenges associated with combustion chamber shape, timing, or other geometric and thermodynamic issues, or to experimentally validate theoretical/computational performance predictions.

However, 1CTEs also carry numerous drawbacks. The contributions of the missing cylinders and associated engine components are sometimes critical to accurate simulation of MCE performance, since the collective cylinders cooperate synergistically. As an example, the inertia of the crankshaft, and of the pistons of other cylinders, have an impact on the performance of each cylinder—but since most of the crankshaft (and the other cylinders) are removed in a 1CTE, their contribution is lacking. U.S. Pat. No. 6,708,557 addresses this problem by providing a high-bandwidth transient dynamometer wherein a processor (e.g., a computer, application specific integrated circuit, or other calculating device) simulates the inertial contribution of additional "virtual" cylinders added to a 1CTE, and causes the dynamometer to apply appropriate loads or energy inputs to the 1CTE such that the 1CTE behaves as if the virtual cylinders were physically present within the 1CTE (i.e., as if the 1CTE was a MCE). In similar respects, U.S. patent application Ser. No. 11/063,923 provides an adapter which modifies the air intake of the 1CTE, i.e., the air supplied to its intake valves, to respond as if the 1CTE was present downstream from the intake manifold in an MCE, and in parallel with the intake valves of all other cylinders in an MCE.

However, despite these improvements, there are still other aspects of MCE operation that are currently unaccounted for in 1CTE testing activities. One important aspect is heat transfer: the cylinder in a 1CTE does not receive the heat contributions from the surrounding cylinders that would be present in an MCE. While this often does not have a significant impact on engine speed/load performance, it usually does have a very significant impact on emissions: the emissions from a 1CTE cannot simply be "multiplied" four-fold, six-fold, or by some other amount to obtain the equivalent emissions in the four-, six-, or other cylinder MCE being simulated by the 1CTE. Since researchers generally want the 1CTE's operation to replicate what would be expected in a corresponding MCE, these drawbacks limit the utility of the information provided by the 1CTE. This is particularly true since the study of engine characteristics at low (idling) speeds, and during transient operation, is of significant interest in the study of fuel economy and emissions reduction, and the limitations of the 1CTE greatly hinder its usefulness for this purpose.

SUMMARY OF THE INVENTION

The invention involves an engine testing device which is intended to at least partially solve the aforementioned problems. To give the reader a basic understanding of some of the advantageous features of the invention, following is a brief summary of preferred versions of the testing device. Since this is merely a summary, it should be understood that more details regarding the preferred versions may be found in the Detailed Description set forth elsewhere in this document. The claims set forth at the end of this document then define the various versions of the invention in which exclusive rights are secured.

Looking to the accompanying FIGURE of the drawings, a schematic depiction of an exemplary version of the invention—an engine testing device 100—is shown. The engine testing device 100 includes at least one cylinder 102 of an internal combustion engine (i.e., at least a 1CTE), with the cylinder 102 being shown bounded by a cylinder block 104 and a cylinder head 106 (both illustrated in phantom), and with a (phantom) piston 108 shown spaced away from the side of the cylinder 102 which it enters. Flow passages 110 are defined in the cylinder block 104 adjacent the cylinder 102, and a preferred arrangement is depicted in the FIGURE, wherein the flow passages 110 are arrayed in a circumferential direction about the cylinder 102, and also in an axial direction, so that they rest about at least those sides of the cylinder 102 which would be adjacent other cylinders if the cylinder 102 was present in a complete multi-cylinder internal combustion engine.

The flow passages 110 include inlets 112 which can supply fluid to the flow passages 110, and outlets 114 which can remove fluid from the flow passages 110. At least some of the flow passages 110 have independently controllable fluid flow therein, as by use of the valves 116 shown supplying the inlets 112 to the flow passages 110. In this manner, different flow passages 110 may adapt their adjacent regions of the cylinder block 104 to different temperatures, and thereby simulate the presence of adjacent (but absent) cylinders, ones which would be present if the cylinder 102 was part of a complete MCE. Each flow passage 110 preferably has at least one of independently controllable fluid flow rate and independently controllable fluid flow temperature. In the exemplary version of the testing device 100 shown in the FIGURE, each flow passage 110 is supplied by first and second fluid supplies 118 and 120 which provide fluid at different temperatures, and which are mixed in desired proportions and supplied to the flow passages 110 at desired rates by adjustable connections such as valves 116. (However, in the FIGURE, the first and second fluid supplies 118 and 120 are only shown supplying an axial row of flow passages 110, rather than all flow passages 110, for sake of clarity.)

A processor 122 is then provided which generates virtual cylinder temperature data: data representing the temperatures of one or more "absent" adjacent cylinders, that is, cylinders which would be present adjacent the cylinder 102 if it was present in an MCE. Thus, the virtual cylinders simulate the performance of actual cylinders running in the internal combustion engine adjacent the engine cylinder 102, if these actual cylinders were indeed present (which they are not). (This is schematically depicted in the processor 122 by the presence of one or more virtual cylinders 102$v$, it being understood that these cylinders 102$v$ only exist within the processor 122 as mathematical models.) The processor 122 then controls the fluid supply to the flow passages 110 to adjust the temperature of the engine cylinder 102 about the flow passages 110 to simulate the actual presence of the virtual cylinders 102v adjacent the engine cylinder 102.

Thus, as the testing device 100 operates (with the piston 108 reciprocating in the cylinder 102, etc.), the processor 122 may receive data from the cylinder 102, and may run real-time simulations of the programmed virtual cylinders 102v operating alongside the cylinder 102 (with these virtual cylinders 102v having a number and configuration dictated by the MCE being simulated). The temperature data generated as a result of these simulations may then be used to supply fluid at the desired temperature, to desired flow passages 110, to simulate the thermal presence of the adjacent virtual cylinders 102v (which are physically absent, and are present only in the form of simulations running within the processor 122). As a result, the performance data collected from the cylinder 102 will more accurately reflect the performance of a cylinder as it would behave within an MCE.

Further advantages, features, and objects of the invention will be apparent from the remainder of this document in conjunction with the associated drawings.

BRIEF DESCRIPTION OF THE DRAWING

The FIGURE is a schematic depiction of an exemplary testing device 100 wherein an engine test cylinder 102, which may be taken from an MCE, is operated in parallel with one or more additional virtual cylinders 102v (which exist solely as simulations running within a processor 122), from which temperature data can be extracted so that fluid of suitable temperatures can be supplied from fluid supplies 118 and 120 to flow passages 110 within the cylinder block 104. thereby simulating the thermal presence of the virtual cylinders 102v adjacent the cylinder 102.

DETAILED DESCRIPTION OF PREFERRED VERSIONS OF THE INVENTION

To review, to use the testing device 100 to simulate the presence of additional cylinders operating alongside the test cylinder 102, the processor 122 is programmed to simulate the behavior of one or more virtual cylinders 102v operating in tandem with the cylinder 102. (Various sensors would be provided to monitor the state of the cylinder 102 and provide information to the processor 122 so that MCE performance can be more accurately simulated, but these sensors are not depicted for sake of clarity.) As the testing device 100 is operated at desired speed/load conditions, the processor 122 adapts the behavior of the virtual cylinders 102v accordingly, and adapts the fluid flow to appropriate flow passages 110 to simulate the thermal behavior of these virtual cylinders 102v adjacent the cylinder 102. The cylinder 102 is therefore exposed to operating conditions which more accurately simulate those that the cylinder 102 would experience if it was present in an MCE (with the MCE having a performance and configuration corresponding to any dictated by the mathematical engine behavior models programmed in the processor 122).

To manufacture the testing device 100, the cylinder 102 and its associated cylinder block 104, cylinder head 106, piston 108, etc. can be readily taken from a production engine by sectioning the production engine so that only desired portions remain. In this case, the cylinder head 106 will often contain coolant passages which may be utilized as flow passages 110. However, the cylinder block 104 may not include such passages, or may include them with a configuration and distribution such that fluid flow therein cannot accurately simulate the presence of adjacent cylinders. In this case, flow passages 110 might be drilled into the cylinder block 104, e.g., in axial directions from the top and bottom of the cylinder block 104, either to the opposing side or partway through. Passages can be drilled in from the side to serve as inlets/outlets, or to accommodate bolts or other plugs which define barriers for terminating flow passages. Here, it should be understood that the flow passages 110 may take the form of simple cylindrical conduits, rather than the "chambered" conduits depicted in the drawing. To attain flow passages 110 having a form such as that shown in the drawing, it is generally easiest to cast or machine the cylinder block 104 rather than sectioning it from an MCE. For example, the cylinder block 104 might be formed in several slab-like layers which are then stacked along the axis of the cylinder 102 to construct the cylinder block 104. Once constructed, its thermal and heat transfer characteristics should be experimentally measured and/or computationally derived, and programmed into the processor 122 so that the processor 122 may supply fluid to the flow passages at rates and temperatures such that any heat transfer therefrom (or to the flow passages) accurately simulates the physical presence of the virtual cylinders 102v.

The valves 116, first fluid supply 118, and second fluid supply 120 may take any suitable form, as may the heater for any hot fluid supply 118. (The cold fluid supply 120 may merely use fluid at room temperature, or fluid which is otherwise not actively heated or cooled by the device 100.) In an experimental version of the test device 100, the valves 116 were electro-proportional cartridge valves from Sun Hydraulics Corp. (Sarasota, Fla.), and the hot fluid supply 118 utilized an 18 kW circulation heater from Omega Engineering, Inc. (Stanford, Conn.). As for the fluid used as the heat transfer medium within the flow passages 110, a standard automotive coolant mixture (e.g., 50% ethylene glycol/50% water) is suitable, though other substances having suitable properties (boiling point, fluidity, noncorrosiveness, inflammability, etc.) can be used. The fluid exiting the flow passage outlets 114 was recycled back to the hot fluid supply 118 after heating, and to the cool fluid supply 120 after being cooled by a heat exchanger.

The processor 122 is preferably implemented as a personal computer running suitable software, though a wide variety of equivalent processors may be used instead, such as programmable electronic control modules and other programmable devices which allow rapid calculations. While such reprogrammable processors are preferred owing to their versatility, preprogrammed processors such as suitably configured digital or analog circuits (e.g., Application Specific Integrated Circuits) might also be used.

It should be understood that since the foregoing discussion merely relates to exemplary versions of the invention, the testing device 100 may be varied in numerous respects. As an example, testing devices constructed in accordance with the invention may have flow passages 110 which are arrayed about the cylinder 102 in arrangements different than those in the exemplary device 100 shown in the FIGURE. The numbers of flow passages 110 spaced along the radius and circumference of the cylinder block 104 and cylinder head 106 may be varied, as may the configurations of the flow passages 110. For example, the flow passages 110 need not take the illustrated form of thin chambers extending both axially along the cylinder 102, and also along several degrees of an arc about the cylinder's circumference, though such chambers are useful for heating/cooling greater areas of the cylinder 102. As discussed previously, the flow passages 110 may merely take the form of conduits having cylindrical or other shapes. The flow passages 110 need not be symmetrically spaced about the cylinder 102, and could even be omitted entirely from one or more sides of the cylinder block 104 and head 106, for example, if these sides correspond to an outer side of an MCE. Flow passages 110 may be omitted from the cylinder head 106 (though they're preferably included), and the top of the cylinder head 106 might also bear flow passages 110.

In the testing device 100, it is intended that fluid supply 118 be a high-temperature fluid supply, whereas fluid supply 120 supplies cooler fluid on demand to adapt the temperature of the mixture ultimately supplied to the flow passages 110. Thus, the valve 116 merely serves to proportionately mix the warmer and cooler fluids, which are supplied at a rate dictated by the pressure of the fluid supplies 118 and 120. However, testing devices may use valve 116 and fluid supply 118/120 arrangements which differ significantly from those in the exemplary device 100 shown in the FIGURE. For example, only a single fluid supply 118 might be used (preferably with controllable fluid flow rate, as dictated by the pressure of the fluid supply 118 and/or by the valve 116); more than two fluid supplies 118 and 120 might be used; and each fluid supply might bear an independent valve 116 for amount/rate control; or only certain fluid supplies may bear valves 116 for rate and/or proportion control (e.g., one or more cooler fluid supplies might be valved to supply variable amounts of fluid to a non-valved hot fluid supply). Other variations are also possible. Some of the flow passages 110 may have dependent fluid flow, as by having fluid flow directly from one flow passage 110 to another (in which case they might be regarded as really constituting the same fluid flow passage 110). In this situation, it is preferred that at least the circumferentially-distributed flow passages 110 have independently controllable fluid flow, since the temperature distribution about the circumference of the cylinder 102 tends to vary more substantially than the axial temperature distribution along one side of the cylinder 102 (since certain sides of the cylinder 102 may be adjacent other "hot" cylinders in a corresponding MCE, with other "cold" sides corresponding to side edges of the MCE). Also, while the illustrated flow passages 110 have inlets 112 and outlets 114 spaced in a direction parallel to the axis of the cylinder 102 (for better temperature control about the circumference of the cylinder 102), this is not necessary, nor must the flow directions in all flow passages 110 be similarly oriented (i.e., in a particular single axial and/or circumferential direction).

The invention is not intended to be limited to the versions described above, but rather is intended to be limited only by the claims set out below. Thus, the invention encompasses all different versions that fall literally or equivalently within the scope of these claims.

What is claimed is:

1. An engine testing device comprising an internal combustion engine including an engine cylinder bounded by a cylinder block, the cylinder having flow passages defined in the cylinder block adjacent the cylinder, wherein at least some of the flow passages:
   a. are separate from the other flow passages,
   b. bear the same fluid media as the other flow passages,
   c. and have independently controllable fluid flow therein,
whereby different flow passages may adapt their adjacent regions of the cylinder block to different temperatures.

2. The engine testing device of claim 1 wherein the flow passages having independently controllable fluid flow have independently controllable fluid flow temperature.

3. The engine testing device of claim 1 wherein the flow passages having independently controllable fluid flow have independently controllable fluid flow rate.

4. The engine testing device of claim 1 further comprising a processor generating virtual cylinder temperature data which is representative of the temperatures about at least one virtual cylinder of the internal combustion engine, wherein each virtual cylinder:
   a. is not physically present in the internal combustion engine, and
   b. simulates the performance of an actual cylinder present in the internal combustion engine adjacent the engine cylinder;
wherein the processor controls the fluid supply to the flow passages to adjust the temperature of the engine cylinder about the flow passages to simulate the actual presence of the virtual cylinder adjacent the engine cylinder.

5. The engine testing device of claim 1 wherein at least some of the separate flow passages with independently controllable fluid flow therein are spaced about the circumference of the cylinder.

6. The engine testing device of claim 5 wherein at least some of the separate flow passages each include inlets and outlets spaced in a direction parallel to the axis of the cylinder.

7. The engine testing device of claim 1 wherein at least some of the flow passages are each supplied with fluid from first and second fluid supplies wherein:
   a. the fluid of the first fluid supply is at a different temperature than the fluid of the second fluid supply;
   b. at least one of the first and second fluid supplies has an adjustable connection to the flow passage such that the proportions of fluid supplied to the flow passage by the first fluid supply and second fluid supply may be adjusted, thereby adjusting the temperature of the fluid supplied to the flow passage.

8. The engine testing device of claim 7 wherein both of the first and second fluid supplies have an adjustable connection to the flow passage.

9. The engine testing device of claim 1 wherein the cylinder block has only a single cylinder defined therein.

10. An engine testing device comprising:
    a. an internal combustion engine including an engine cylinder bounded by a cylinder block;
    b. a flow passage defined in the cylinder block adjacent the cylinder;
    c. first and second fluid supplies wherein:
       (1) the first and second fluid supplies bear fluids, with the fluid of the first fluid supply being at a different temperature than the fluid of the second fluid supply;
       (2) the first and second fluid supplies are connected in fluid communication with the flow passage, with at least one of the connections being adjustable, whereby the proportions of fluid supplied by the first fluid supply and second fluid supply may be varied.

11. The engine testing device of claim 10 further comprising a processor generating virtual cylinder temperature data which is representative of the temperatures about at least one virtual cylinder of the internal combustion engine, wherein each virtual cylinder:
    a. is not physically present in the internal combustion engine, and
    b. simulates the performance of an actual cylinder present in the internal combustion engine adjacent the engine cylinder;
wherein the processor controls at least one of the first and second fluid supplies to the flow passage.

12. The engine testing device of claim 10 wherein multiple flow passages are defined in the cylinder block adjacent the cylinder, wherein at least some of the flow passages are separate from the others and include independent connections to the first and second fluid supplies, whereby different flow passages may adapt their adjacent regions of the cylinder block to different temperatures.

13. The engine testing device of claim 12 wherein at least some of the multiple flow passages are spaced about the circumference of the cylinder.

14. The engine testing device of claim 13 wherein at least some of the separate flow passages each include inlets and outlets spaced in a direction parallel to the axis of the cylinder.

15. The engine testing device of claim 12 wherein at least some of the separate flow passages have independently controllable fluid flow rate.

16. An engine testing device comprising:
 a. an internal combustion engine including:
  (1) an engine cylinder bounded by a cylinder block,
  (2) a flow passage defined in the cylinder block adjacent the cylinder, and
  (3) a fluid supply supplying the flow passage with fluid;
 b. a processor generating virtual cylinder temperature data which is representative of the temperatures about at least one virtual cylinder of the internal combustion engine, wherein each virtual cylinder:
  (1) is not physically present in the internal combustion engine, and
  (2) simulates the performance of an actual cylinder present in the internal combustion engine adjacent the engine cylinder;

wherein the processor controls the fluid supply to adjust the temperature of the engine cylinder about the flow passage to simulate the actual presence of the virtual cylinder adjacent the engine cylinder.

17. The engine testing device of claim 16 wherein:
 a. multiple flow passages are defined in the cylinder block adjacent the cylinder, and
 b. at least some of the flow passages have fluid supplies which are independently controlled by the processor.

18. The engine testing device of claim 17 wherein at least some of the multiple flow passages are spaced about the circumference of the cylinder.

19. The engine testing device of claim 18 wherein at least some of the multiple flow passages each include inlets and outlets spaced in a direction parallel to the axis of the cylinder.

20. The engine testing device of claim 17 wherein at least some of the multiple flow passages are each supplied with fluid from first and second fluid supplies wherein:
 a. the fluid of the first fluid supply is at a different temperature than the fluid of the second fluid supply;
 b. the fluid of the first and second fluid supplies is mixed prior to being provided to the flow passage.

21. The engine testing device of claim 20 wherein the processor controls mixing of the fluid of the first and second fluid supplies.

22. The engine testing device of claim 17 wherein the processor independently controls the fluid flow rates of at least some of the multiple flow passages.

* * * * *

UNITED STATES PATENT AND TRADEMARK OFFICE
CERTIFICATE OF CORRECTION

| | | |
|---|---|---|
| PATENT NO. | : 7,506,537 B2 | Page 1 of 1 |
| APPLICATION NO. | : 11/469741 | |
| DATED | : March 24, 2009 | |
| INVENTOR(S) | : John J. Moskwa et al. | |

It is certified that error appears in the above-identified patent and that said Letters Patent is hereby corrected as shown below:

Title page, item [75] Inventor: change Steven J. Klick to Stephen J. Klick.

Signed and Sealed this

Thirtieth Day of June, 2009

JOHN DOLL
*Acting Director of the United States Patent and Trademark Office*